(12) United States Patent
Frezza et al.

(10) Patent No.: US 12,704,423 B2
(45) Date of Patent: Aug. 11, 2026

(54) MODULAR TOOL FOR MEASURING DISASSEMBLY TORQUES

(71) Applicant: Aktiebolaget SKF, Gothenburg (SE)

(72) Inventors: Pasquale Frezza, Aversa (IT); Fausto Baracca, Massa (IT); Alessio Nebbia Colomba, Pisa (IT); Renato Berti, Massa (IT)

(73) Assignee: Aktiebolaget SKF, Gothenburg (SE)

(*) Notice: Subject to any disclaimer, the term of this patent is extended or adjusted under 35 U.S.C. 154(b) by 273 days.

(21) Appl. No.: 18/748,262

(22) Filed: Jun. 20, 2024

(65) Prior Publication Data

US 2025/0003816 A1 Jan. 2, 2025

(30) Foreign Application Priority Data

Jun. 28, 2023 (IT) ........................ 102023000013455

(51) Int. Cl.
*G01L 3/00* (2006.01)
*G01L 5/00* (2006.01)

(52) U.S. Cl.
CPC .............. *G01L 3/00* (2013.01); *G01L 5/0042* (2013.01)

(58) Field of Classification Search
CPC . G01L 3/00; G01L 5/0042; G01L 5/24; G01L 5/0009; B25B 27/0028; B25B 13/48; G01M 13/04
See application file for complete search history.

(56) References Cited

U.S. PATENT DOCUMENTS

2023/0072450 A1 3/2023 Bertolini et al.

FOREIGN PATENT DOCUMENTS

| | | | | |
|---|---|---|---|---|
| CN | 2637276 Y | * | 9/2004 | |
| CN | 111300319 A | * | 6/2020 | ............. B25B 13/06 |
| DE | 102022209084 A1 | | 3/2023 | |
| WO | WO-2020117067 A1 | * | 6/2020 | ............. E21B 19/16 |

OTHER PUBLICATIONS

Examiner's Report for Italian Application No. 102023000013455, dated Dec. 20, 2023, 8 pages.

* cited by examiner

*Primary Examiner* — David Z Huang
(74) *Attorney, Agent, or Firm* — Stinson LLP

(57) ABSTRACT

A modular tool (10) for measuring the disassembly torques of a metal shield (36) of a seal (35) for a bearing unit (30). The tool (10) has a torque gauge (20) equipped with a hexagonal key (22). A base element (40) is rotationally integral with the torque gauge (20). A modular element (50) is rotationally integral with the base element (40) and with the shield (36) of the bearing unit (30). The tool includes a support platform (6) for the bearing unit (30). The base element (40) is invariable with respect to the size of the bearing unit (30). The modular element (50) has a variable size according to the size of the bearing unit (30).

8 Claims, 3 Drawing Sheets

Fig. 2 – Det. A

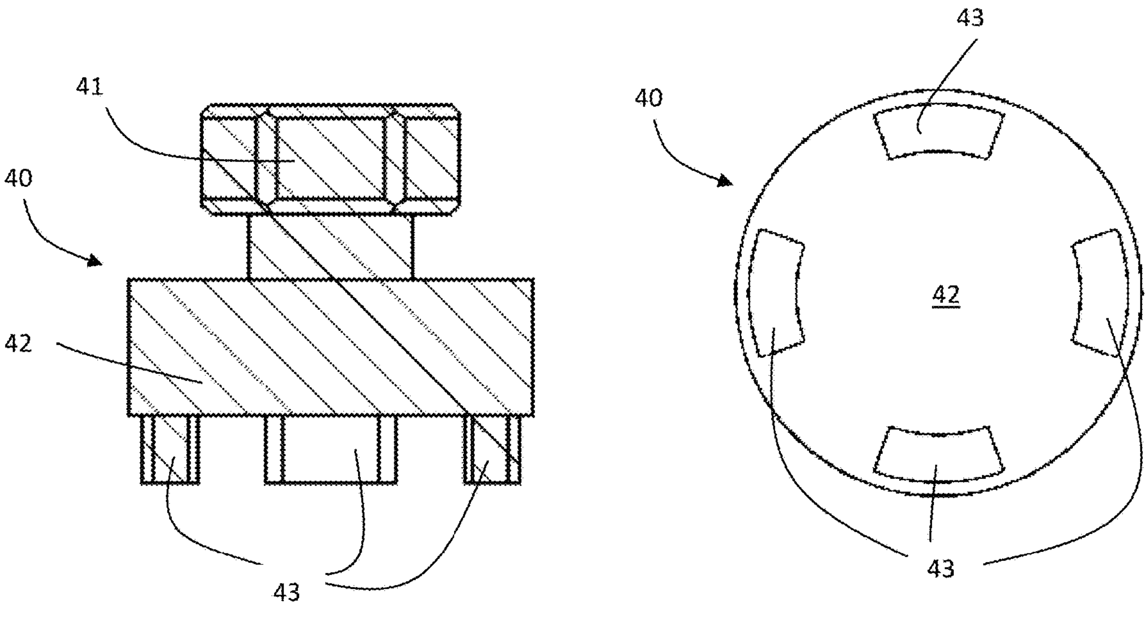
Fig. 3
Fig. 4
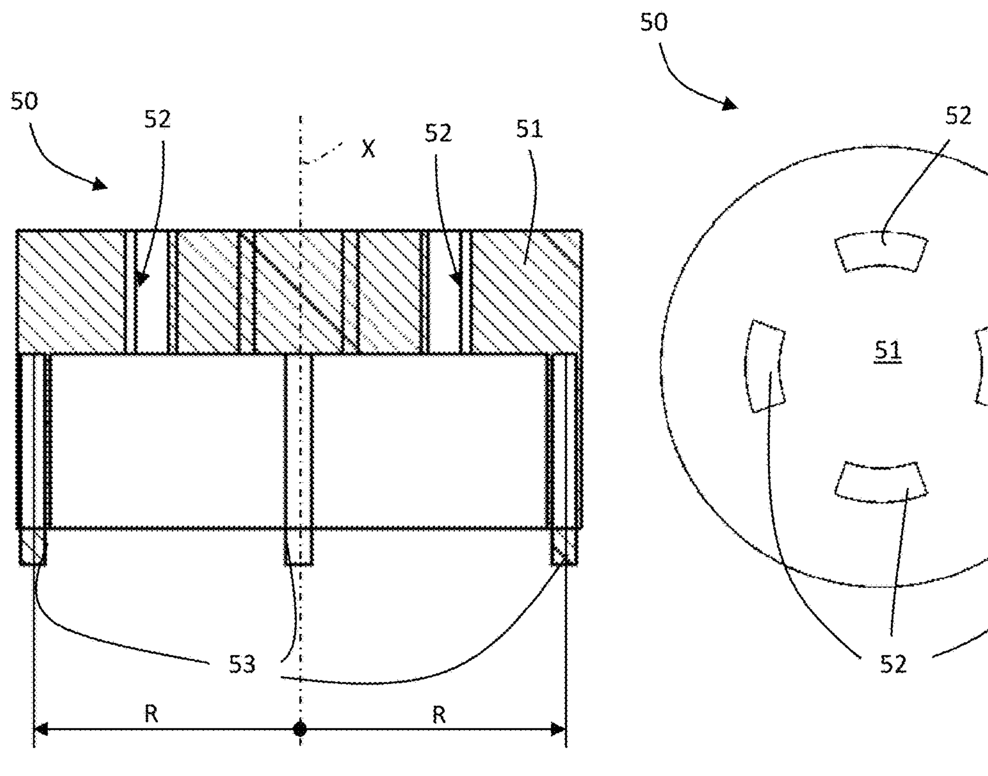
Fig. 5
Fig. 6

MODULAR TOOL FOR MEASURING DISASSEMBLY TORQUES

CROSS-REFERENCE TO RELATED APPLICATION

This application claims priority to Italian Application No. 102023000013455, filed Jun. 28, 2023, the entirety of which is hereby incorporated by reference.

FIELD

The present disclosure relates to a modular tool for measuring disassembly torques. In particular, the tool may be used for checking the torque for disassembly of the shield of a seal from a bearing unit.

BACKGROUND

Bearing units are provided with seals for protecting the internal components of the bearing unit (essentially raceways and rolling elements) against external contaminants (water, dust, sludge) and for retaining the lubrication grease inside the bearing unit.

The seals are normally formed by one or more metal shields on which a coating of elastomeric material is comoulded, said coating being in turn provided with contacting or non-contacting sealing lips. The metal shield is preferably, but not exclusively, mounted by means of interference on the stationary ring of the bearing unit, while the lips make contact with or lightly touch a rotating surface of the rotating ring of the bearing unit.

It is important, for the purposes of correct operation of the seal, to measure the torque for disassembly of the metal shield from the stationary ring of the bearing unit. In order for assembly of the shield to be performed in the correct manner, the disassembly torque must have a value within a predetermined range which complies with an assembly specification.

At present the disassembly torque of the shield is measured in different ways and depending on the size of the bearing unit. For this purpose measuring tools which differ from each other in terms of both type and size, depending on the size of the bearing unit, are used. Furthermore, it frequently happens that different production sites use different tools for the same type and size of bearing unit. This results in the drawback that different torque values are obtained, depending on the tool used, these in some cases being outside of the specified range.

SUMMARY

The object of the present disclosure is to provide a modular tool for measuring the torque for disassembly of a sealing shield from a bearing unit, which does not have the aforementioned drawbacks.

According to the present disclosure a modular tool for measuring the disassembly torque having the characteristic features indicated in the attached claims is provided.

BRIEF DESCRIPTION OF THE DRAWINGS

The present disclosure will now be described with reference to the attached drawings which illustrate a non-limiting example of embodiment thereof, in which:

FIGS. 3 and 4 show a cross-sectional view of a base element of the tool according to FIG. 1; and FIGS. 5 and 6 show a cross-sectional view of a modular element of the tool according to FIG. 1.

DETAILED DESCRIPTION

Figure 1:
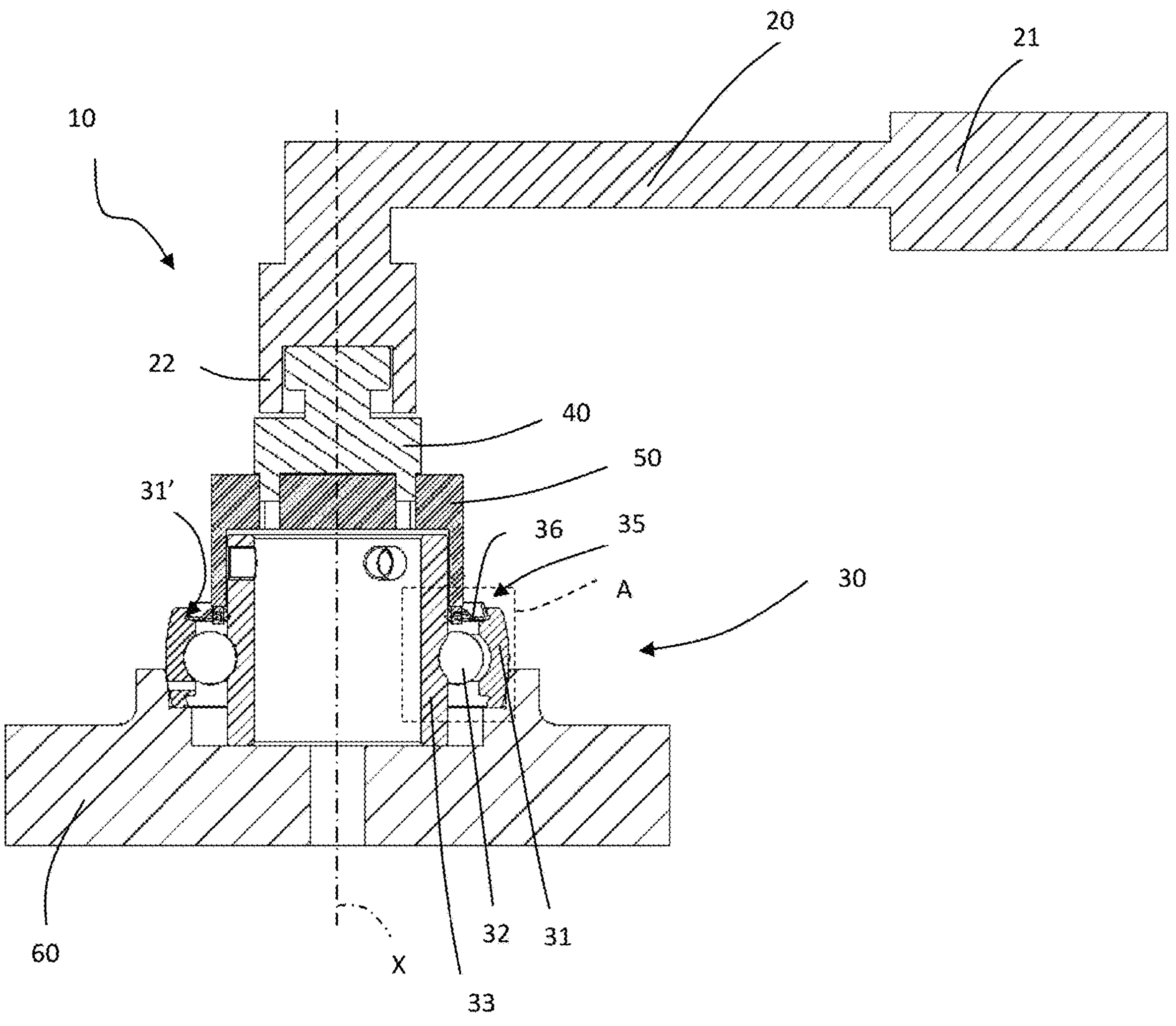
FIG. 1 shows a cross-sectional view of a tool for measuring the torque for disassembly of a sealing shield from a bearing unit according to a preferred embodiment of the present disclosure.

With reference to FIG. 1, a modular tool 10 is used to measure the disassembly torques and, in particular, to measure the torque for disassembly of a metal sealing shield from a respective bearing unit 30.

The bearing unit 30 has a central axis X of rotation and comprises:

- a stationary radially outer ring 31;
- a radially inner ring 33 which is rotatable;
- a row 32 of rolling elements, in this example balls, interposed between the radially outer ring 31 and the radially inner ring 33; and
- at least one seal 35 for protecting the bearing unit 30 from external contaminants.

In the whole of the present description and in the claims, the terms and expressions indicating positions and orientations, such as "radial" and "axial" are understood as being in relation to the central axis X of rotation of the bearing unit 30.

Figure 2:
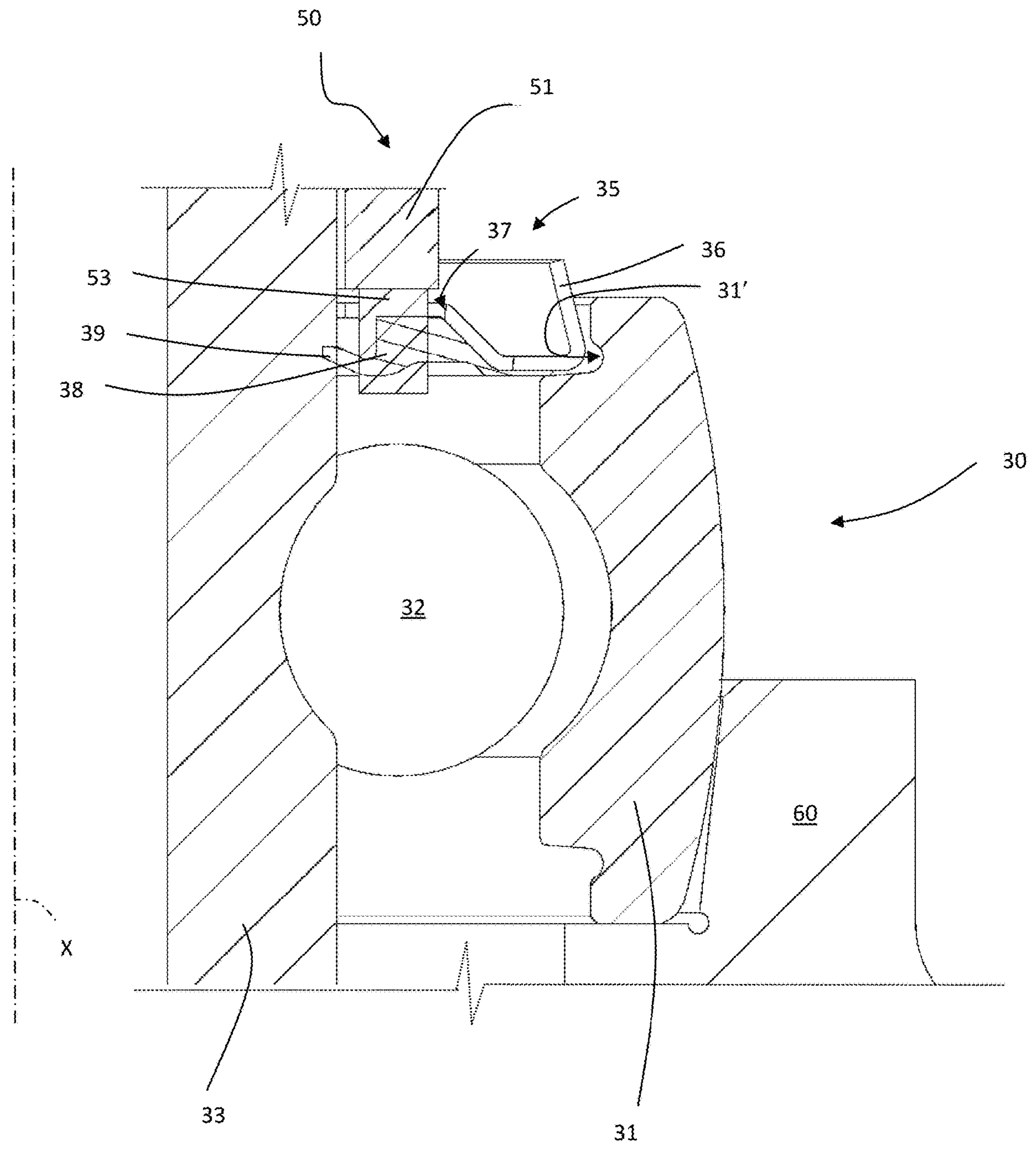
FIG. 2 shows a detail of the tool according to FIG. 1.

With reference also to FIG. 2, the seal 35 comprises:

- a shaped metal shield 35 mounted by means of interference inside a seat 31' of the radially outer ring 31 and provided with a plurality of through-holes 37; the holes 37 are arranged circumferentially and at 90° with respect to each other and are preferably four in number; the holes 37 are shaped so as to engage with the tool 10, as will be explained below; and
- a coating 38 of elastomeric material co-moulded onto the metal shield 36 and provided with at least one sealing lip 39.

The modular tool 10 according to the present disclosure comprises:

- a torque gauge 20, for example a torque wrench, of the known type and for this reason only schematically shown in FIG. 1, provided with a display 21 for viewing the torque value measured and a hexagonal key 22;
- a base element 40, which is invariable with respect to the size of the bearing unit 30 and which, during use, assumes the axis X of rotation of the bearing unit 30 as axis of symmetry;
- a modular element 50, which is variable according to the size of the bearing unit 30 and which, during use, assumes the axis X of rotation of the bearing unit 30 as axis of symmetry; and
- a support platform 60 for the bearing unit 30, configured to stably lock both the radially outer ring 31 and the radially inner ring 33.

With reference to FIGS. 3 and 4, the base element 40 comprises in turn:

- a hexagonal head 41, suitable for engaging with the hexagonal key 22 of the torque gauge 20 so that a relative rotation of the torque gauge 20 and the base element 40 is prevented;
- a substantially cylindrical body 42 integral with the hexagonal head 41; and a plurality of teeth 43 which, in the preferred embodiment shown, are integral with the body 42 from which they protrude axially and are preferably four in number, are arranged circumferentially at 90° with respect to each other and have a cross-section in the shape of a circular crown segment.

With reference to FIGS. 5 and 6, the modular element 50 comprises in turn:

a substantially cylindrical body 51;

a plurality of through-slots 52, formed with a circumferential arrangement inside the body 51; the slots 52 also, according to the preferred embodiment shown, are preferably four in number, arranged at 90° with respect to each other and have a cross-section in the shape of a circular crown segment; the dimensions of the cross-section of the slots 52 are substantially equivalent to the dimensions of the teeth 43 of the base element 40 so that respective teeth 43 may engage inside respective through-slots 52, such that the base element 40 and the modular element 50 are rotationally integral; and a plurality of pins 53, with a substantially cylindrical shape, which protrude axially from the body 51 with which they are integral; the pins 53, according to the preferred embodiment shown, are preferably four in number and arranged circumferentially at 90° with respect to each other; the circular cross-section of the pins 53 is substantially the same as the circular cross-section of the holes 37 of the shield 36 so that respective pins 53 may engage inside respective through-holes 37, making the modular element 50 and the metal shield 36 rotationally integral with each other.

The modularity of the element 50 is provided by the radial positioning of the pins 53. In fact, depending on the size of the bearing unit 30, the size of the metal shield 36, and consequently the radial position of the holes 37 in the shield 36 and of the respective pins 53 of the modular element 50, will vary: for greater diameters of the bearing unit 30 and, consequently, of the shield 36, the pins 53 will be radially positioned with respect to the axis of symmetry X with a proportionally greater radius R.

The operating principle of tool 10 may be easily understood considering that:

the bearing unit 30 is stably locked on the platform 60;

the torque gauge 20, the base element 40, the modular element 50 and the metal shield 36 are rotationally integral with each other;

the metal shield 36 is locked by means of interference inside the seat 31' of the radially outer ring 31.

The torque gauge 20 will transmit an increasing torque to the metal shield 36 and the values of the transmitted torque may be viewed on the display 22. With an increase in the transmitted torque, the shield 36 will start to rotate with respect to the radially outer ring 31.

The value of the torque required to cause rotation of the shield 36, with respect to the radially outer ring 31, through an angle of 45° is, by definition, the minimum torque value for establishing that the shield 36 is rotatable. If this torque value is greater than the torque indicated in the specification for the "rotatability" of the shield 36, then the shield 36 may be regarded as being effectively locked inside the seat 31' of the radially outer ring 31.

Therefore, the modular tool, according to the present disclosure, is able to avoid the use of different instruments for measuring the disassembly torque of the sealing shield. Consequently, this avoids the risk that different instruments may provide torque values which are different and, in some cases, outside of the specified range. Owing to the present disclosure, instead, it is possible to use a single modular tool characterized by a standard base element 40, i.e. one which is invariable with respect to the dimensions of the bearing unit, and by a modular element which can be adapted to bearing units with different dimensions.

Moreover, this modular tool may be used as a standard tool also in different production sites.

Even more importantly, this tool may be used both in production and assembly departments and in quality control departments. It is thus possible to carry out a double check of the disassembly torque using the same tool. The quality control departments may moreover create quality control summary tables for the various disassembly torque values depending on the size of the bearing unit, with the certainty of providing reliable results irrespective as to the measuring instrument.

In addition to the embodiment of the present disclosure, as described above, it must be understood that there exist numerous other variants. It must also be understood that these embodiments are only examples and do not limit either the scope of the present disclosure, nor its applications, nor its possible configurations. On the contrary, although the description above allows the person skilled in the art to implement the present disclosure at least according to one of its examples of embodiment, it must be understood that many variants of the components described are possible, without thereby departing from the scope of the present disclosure, as defined in the accompanying claims, interpreted literally and/or in accordance with their legal equivalents.

What is claimed is:

1. A modular tool for measuring disassembly torques of a metal shield of a seal for a bearing unit, the bearing unit having an axis of rotation, a radially outer ring, and a radially inner ring, the radially outer ring being stationary having a seat, the radially inner ring being rotatable, the shield being mounted by means of interference in the seat of the radially outer ring and has a plurality of through-holes, the modular tool comprising:

a torque gauge having a hexagonal key;

a base element rotationally integral with the torque gauge and which is configured, during use, to assume the axis of rotation of the bearing unit as an axis of symmetry, the base element being invariable with respect to the size of the bearing unit;

a modular element rotationally integral with the base element and configured to be rotationally integral with the shield of the bearing unit, the modular element being configured, during use, to assumes the axis of rotation of the bearing unit as an axis of symmetry, the modular element having a variable size according to the size of the bearing unit; and a support platform for the bearing unit, the support platform configured to stably lock both the radially outer ring and the radially inner ring.

2. The tool according to claim 1, wherein the base element comprises:

a hexagonal head configured to engage the hexagonal key of the torque gauge so that a relative rotation of the torque gauge and the base element is prevented;

a cylindrical body integral with the hexagonal head; and a plurality of teeth integral with and protruding axially from the body.

3. The tool according to claim 2, wherein the modular element comprises:

a cylindrical body;

a plurality of through-slots formed with a circumferential arrangement inside the body and having a cross-section substantially equivalent to a cross-section of the teeth of the base element so that respective teeth can engage inside respective through-slots; and a plurality of cylindrical pins integral with the body from which the pins protrude axially and having a circular cross-section substantially the same as the circular cross-section of the holes of the shield so that respective pins can engage inside respective through-holes.

4. The tool according to claim 3, wherein the teeth of the plurality of teeth and the slots of the plurality of slots are arranged circumferentially at 90° with respect to each other and have a cross-section in the shape of circular crown segment.

5. The tool according to claim 3, wherein the pins of the plurality of pins are four in number and arranged circumferentially at 90° with respect to each other.

6. The tool according to claim 3, wherein for larger diameters of the bearing unit, the pins will be positioned radially with respect to the axis with a proportionally greater radius.

7. The tool according to claim 5, wherein for larger diameters of the bearing unit, the pins will be positioned radially with respect to the axis with a proportionally greater radius.

8. The tool according to claim 1, in combination with the metal shield and the bearing unit.

* * * * *